United States Patent [19]
Rensch

[11] Patent Number: 6,092,915
[45] Date of Patent: Jul. 25, 2000

[54] DECORATIVE LIGHTING LAMINATE

[75] Inventor: Gregory James Rensch, Sumner, Wash.

[73] Assignee: The Boeing Company, Seattle, Wash.

[21] Appl. No.: 09/016,057

[22] Filed: Jan. 30, 1998

[51] Int. Cl.[7] ............................................. F21V 1/20
[52] U.S. Cl. .......................... 362/471; 362/30; 362/489; 362/311
[58] Field of Search ............................ 362/29, 470, 471, 362/800, 489, 806, 311, 360, 30

[56] References Cited

U.S. PATENT DOCUMENTS

| | | | |
|---|---|---|---|
| 2,660,824 | 12/1953 | Neugass | ............................ 362/471 X |
| 4,521,835 | 6/1985 | Meggs et al. | ............................ 362/470 |
| 4,648,690 | 3/1987 | Ohe . | |
| 5,352,532 | 10/1994 | Kline . | |
| 5,642,929 | 7/1997 | Ushimaru | ................................ 362/85 |

Primary Examiner—Stephen Husar
Attorney, Agent, or Firm—Christensen O'Connor Johnson & Kindness pllc

[57] ABSTRACT

The present invention provides a decorative lighting laminate that can be made to glow or illuminate while shielding the laminate's light source components from view. The decorative lighting laminate is made from a decorative laminate that includes a transparent base layer and a thin translucent decorative covering layer. In a preferred embodiment, the base layer is made from a clear polycarbonate material and the decorative covering layer is made from an organic fluoropolymeric, such as a polyvinyl fluoride or a polyvinylidene fluoride polymeric material.

26 Claims, 4 Drawing Sheets

6,092,915

DECORATIVE LIGHTING LAMINATE

FIELD OF THE INVENTION

The present invention relates to a decorative lighting laminate and, more particularly, to a decorative laminate that shields light source components from view.

BACKGROUND OF THE INVENTION

The design and fabrication of decorative lighted parts is often expensive. The expense is due in part to the design, fabrication, and assembly of optical display lenses into the decorative part. Furthermore, display lenses often reduce the aesthetic appeal of the decorative lighted part. In addition, these lenses require cleaning and maintenance that is both time consuming and ultimately reduces the lifetime of the lens. For decorative lighted parts incorporated into commercial aircraft interiors, display lenses increase the overall weight of the component part, which is economically disadvantageous.

A need exists for decorative lighted parts that can be simply designed and fabricated without the disadvantages associated with display lenses. A need also exists for providing decorative lighted parts having enhanced aesthetics. The present invention seeks to fulfill these needs and provides further related advantages.

SUMMARY OF THE INVENTION

The present invention provides a decorative lighting laminate that can be made to glow or illuminate while shielding unsightly light source components from view. The decorative lighting laminate includes hidden or shrouded signal lighting that can be illuminated upon demand. When the signal lighting is not illuminated, the light source components are hidden by the laminate's translucent covering. The decorative lighting laminate is made from a decorative laminate that includes a transparent base layer and a thin translucent decorative covering layer. In a preferred embodiment, the base layer is made from a clear polycarbonate material. The laminate's decorative covering layer is also a light-transmitting layer but, unlike the transparent base layer, the decorative layer is translucent and has an opacity sufficient to shield the light source from view when not illuminated. The decorative layer is preferably made from a thermoplastic resinous material including, for example, an organic fluoropolymer such as a polyvinyl fluoride or a polyvinylidene fluoride polymer. The laminate's decorative layer is affixed to the base layer by an intermediate layer that includes an adhesive material.

The decorative laminate of the present invention can be molded and formed into a variety of shapes and configurations such as a decorative interior part useful for a variety of applications including, for example, commercial aircraft interior parts. In general, one or more light sources can be combined with the molded decorative laminate to form a decorative lighting laminate. Positioning a light source adjacent the transparent base layer allows the laminate to transmit light while, by virtue of the translucent decorative covering layer, shielding the light source from view.

When formed into a part, the decorative lighting laminate of the present invention is particularly useful as commercial aircraft interior parts for indicating emergency exits and routes, and for illuminating and indicating door and/or window handles for emergency exits.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
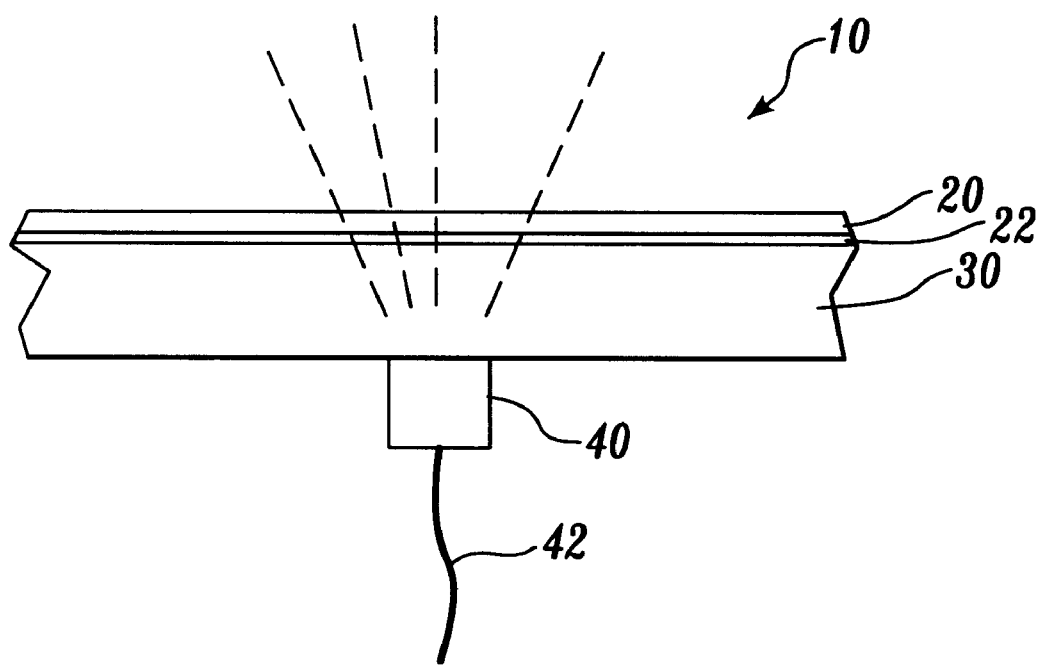
FIG. 1 is a cross-sectional view of a decorative lighting laminate formed in accordance with the present invention.

In one aspect, the present invention provides a decorative, light-transmitting laminate that is useful for forming decorative lighted interior parts, for example, commercial aircraft interior parts. When formed into an interior part, the molded laminate can be combined with one or more light sources to provide a decorative lighting laminate that can be made to glow or illuminate on demand. When not illuminated, the laminate has an opacity sufficient to hide or shield the light source component from view.

The decorative laminate of the present invention is a light-transmitting laminate that includes a transparent, light-transmitting base layer and a translucent, light-transmitting decorative covering layer. The decorative layer is affixed to the base layer by an intermediate layer that includes an adhesive material. The transparent base layer and translucent decorative covering are made from moldable, thermoplastic resinous materials. Both the base layer and decorative covering layer are light transmitting; the base layer being substantially transparent (i.e., made from one or more transparent or semitransparent plastic materials) and the decorative covering being translucent. The laminate's decorative covering has an opacity sufficient to shield from view a light source component positioned adjacent the base layer.

The laminate's transparent, light-transmitting base layer imparts structural integrity to the laminate. The base layer can be made from any suitably transparent and moldable thermoplastic resinous material. In a preferred embodiment, the base layer is made from a clear polycarbonate sheet. Alternatively, the base layer can be prepared from the consolidation of several plies of fiberglass-polyester prepreg, a fibrous material, in the form of a sheet or on a mandrel, onto which resin is applied to create a reinforced plastic product. Other transparent thermoplastic materials suitable for the base layer include Lexan® polycarbonate (PC) (General Electric), Declar° polyether ketone ketone (PEKK) (DuPont), and Radel® polyphenylene sulfone (PPS) (Amoco Performance Products). The base layer can also be a fiberglass laminate such as a molded fiberglass-epoxy or fiberglass-polyester laminate having from one to about ten plies (each ply having a thickness of about 0.01 inch). Preferably, the base layer has a thickness in the range between from about 0.010 inch to about 0.125 inch.

The laminate's decorative covering layer can be made from a suitably translucent and moldable thermoplastic resinous material. Preferred thermoplastic materials include fluorinated organic polymeric materials such as, for example, polyvinyl fluoride (PVF) and polyvinylidene fluoride (PVDF) polymeric materials. Preferably, the decorative covering layer has a thickness from about 0.0015 inch to about 0.0040 inch. In a preferred embodiment, the decorative covering is a thermoplastic film such as a PVF or a PVDF film. A preferred PVF film is commercially available from E.I. DuPont de Nemours & Co. (Wilmington, Del.) under the designation Tedlar®. A preferred PVDF film is commercially available from Avery Dennison (Schererville, IN) under the designation Avimark®.

In one preferred embodiment, the decorative light-transmitting laminate of the present invention has a transparent base layer made from clear polycarbonate and a translucent decorative covering made from a fluorinated organic polymeric material selected from PVF and PVDF polymeric materials.

The decorative laminate of the invention is a thermoplastic sheet material that can be prepared by press laminating the translucent decorative covering onto a surface of the transparent base layer. For example, in a preferred embodiment, a thin film of translucent Tedlar® is press laminated onto a clear transparent polycarbonate sheet.

After the decorative laminate sheet material is prepared, the sheet material can be thermoformed onto a mold die to provide a molded decorative laminate (i.e., a decorative laminate part). The mold die can be, for example, a textured mold die. Thus, depending on the particular mold die, the decorative laminate sheet material can be formed into a variety of decorative parts including, for example, decorative parts for commercial aircraft interiors. Examples of commercial aircraft interior parts that can be readily formed from the decorative laminate sheet material include door linings and window bezels, door handle escutcheons, emergency route indicator strips, stowage bin faceplates/bullnoses, passenger service unit (PSU) spacer panels, flight deck interior-window linings, consoles, instrument panels, cup holders, and pocket holders for sunvisors and reference manuals. Other decorative parts including panels, covers, escutcheons, and shrouds can also be similarly prepared using the decorative laminate sheet material of the present invention.

When combined with one or more light sources, a molded decorative laminate part formed from the decorative laminate sheet material provides a decorative lighting laminate (i.e., a decorative lighting laminate part) that can be made to glow or illuminate on demand while shielding light source components from view. As noted above, such a decorative lighting laminate is particularly useful in commercial aircraft interiors for illuminating emergency routes, exits, and exit door and/or window handles. Because the light source components of these decorative lighting laminates are hidden from view, these decorative parts have enhanced aesthetic appeal compared to other decorative parts having light sources that are observable.

Suitable light sources useful in the decorative lighting laminate of the present invention include point light sources, such as light bulbs and light-emitting diodes (LEDs), and diffuse light from remote light sources. The light sources generally provide signal lighting, for example, emergency signal lighting. In one preferred embodiment, the decorative lighting laminate part includes an array of LEDs. Alternatively, the light source can include a remote light source coupled to one or more optical fibers that terminate at the transparent base layer of the decorative laminate.

A layer containing an adhesive material affixes the decorative layer to the base layer. Referring to FIG. 1, decorative layer 20 is affixed to base layer 30 by adhesive-containing layer 22. Layer 22 can include any adhesive material suitable for affixing the decorative layer to the base layer. Suitable adhesive materials include thermoplastic and thermosetting adhesive materials such as acrylic and polyurethane adhesive materials. In a preferred embodiment, the adhesive material is an acrylic adhesive having a thickness of about 0.2 mils, commercially available from DuPont under the designation 68080 or 68040 acrylic adhesive. Thermoplastic and thermosetting adhesives are particularly preferred for laminates of the present invention that are formed by thermoforming methods.

Other suitable adhesive materials include pressure-sensitive and heat-activatable adhesive materials. Pressure-sensitive adhesive materials can be applied as a film or coating. Suitable pressure-sensitive adhesives include, for example, a 3–6 mil thick adhesive available from the 3M Company (Knoxville, Iowa) under the designation 468MPF. In a preferred embodiment, the pressure-sensitive adhesive is a 3 mil thick adhesive available from Bostik Inc. (iddleton, Mass.) under the designation S408–4084. Alternatively, the adhesive material can be a heat-activatable adhesive. Preferred heat-activatable adhesives include thermosetting and thermoplastic adhesives. Thermosetting adhesives can be combined with solvents and applied by spraying. The laminate's decorative layer can be affixed to the base layer by heating to cure the adhesive material. In a preferred embodiment, the heat-activatable adhesive is a 1.5 mil thick thermoplastic adhesive film available from Bostik under the designation 10-309-1.5. The pressure-sensitive and heat-activatable adhesives are particularly preferred for the laminates of the present invention formed by wrapping the decorative layer onto a base layer formed from a molded fiberglass laminate, for example, a fiberglass-epoxy laminate.

The present invention also provides a method for forming a decorative lighting laminate (e.g., an aircraft interior light part). In a method, a translucent decorative layer is formed onto a transparent base layer by, for example, press lamination. In the press lamination method, an adhesive layer is included intermediate the decorative and base layers. The resulting light-transmitting laminate can then be thermoformed on a mold die (e.g., an aircraft interior lighting part mold die including, for example, textured mold dies that impart surface texture to the laminate's surface) to provide a molded, light-transmitting laminate. Alternatively, Tedlar capped sheets of transparent base materials (e.g., Declar, commercially available from DuPont, and Lexan, commercially available from General Electric) can be thermoformed directly. In another method, the translucent decorative layer can be laminated onto an already molded transparent base layer. For example, the decorative layer can be hand wrapped onto a molded base layer made from a fiberglass laminate, such as a fiberglass-epoxy laminate, coated with an adhesive material. The final decorative lighting laminate or part is assembled by affixing at least one light source (e.g., an LED or an array of LEDs) to the molded laminate adjacent the base layer.

A cross-sectional view of a portion of the decorative lighting laminate formed in accordance with the present invention is shown in FIG. 1. Referring to FIG. 1, decorative lighting laminate 10 includes a translucent decorative covering layer 20, intermediate layer 22, and transparent base layer 30. As described above, a moldable decorative laminate sheet comprising base layer 30 and decorative covering 20 can be formed by, for example, thermoforming. Once the decorative laminate is molded to a particular shape and configuration defining, for example, an aircraft interior lighting part, one or more light sources 40 can be added to the part by, for example, mounting the light source to base layer 30. Power to light source 40 is provided by supply line 42.

Figure 2A:
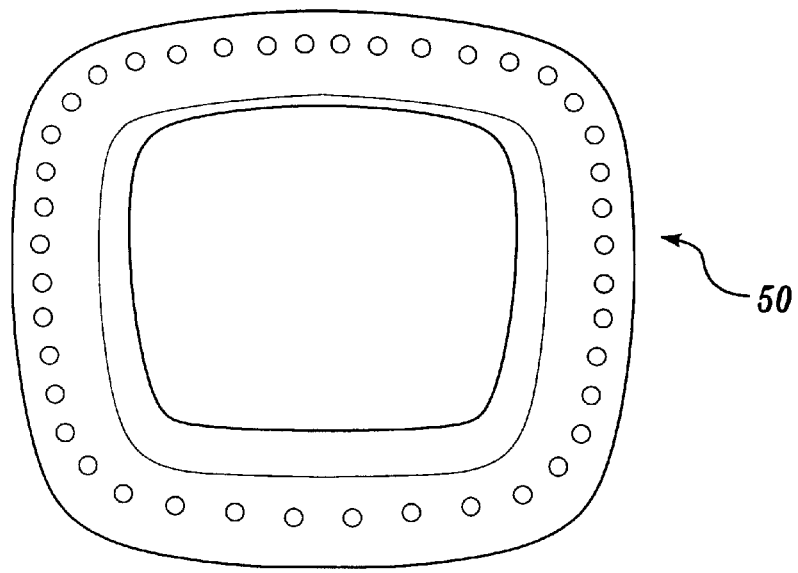
FIG. 2A is a plan view of an illuminated representative decorative lighting laminate, a door handle escutcheon, formed in accordance with the present invention.
Figure 2B:
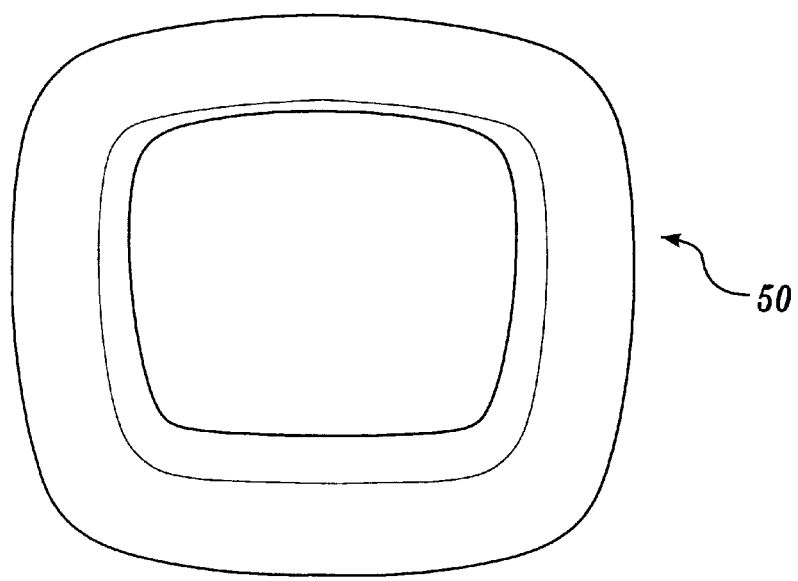
FIG. 2B is a plan view of the nonilluminated escutcheon of FIG. 2A.

A plan view of a representative decorative lighting laminate part formed in accordance with the present invention, a door handle escutcheon, is shown in FIGS. 2A and 2B. FIG. 2A illustrates illuminated escutcheon 50 and FIG. 2B illustrates the nonilluminated escutcheon. As shown in FIG. 2B and discussed above, the decorative lighting laminate&s light sources are not visually observable when the light sources are not illuminated.

Figure 3:
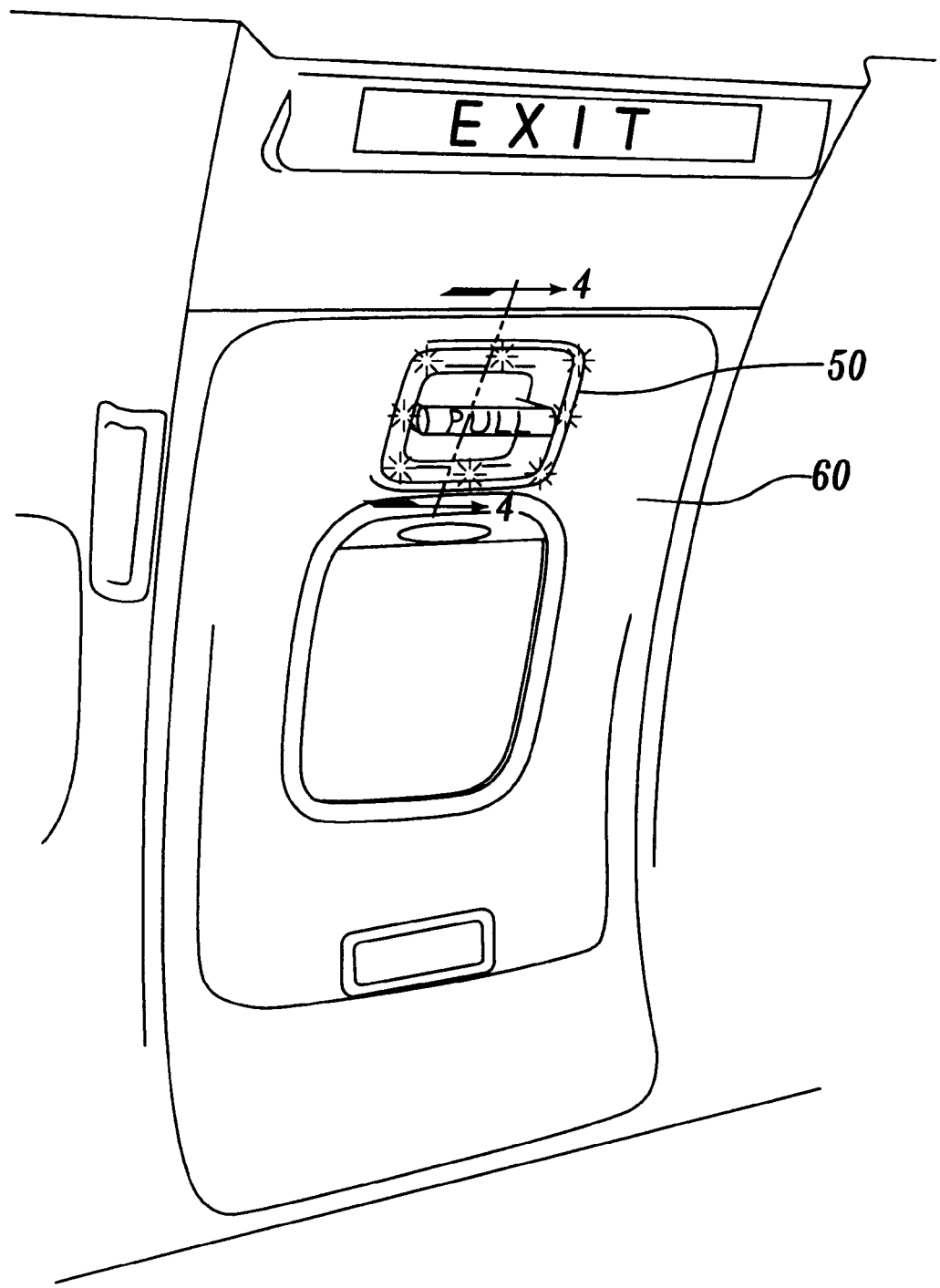
FIG. 3 illustrates a representative decorative lighting laminate, a door handle escutcheon, formed in accordance with the present invention positioned on the interior surface of an aircraft emergency exit.
Figure 4:
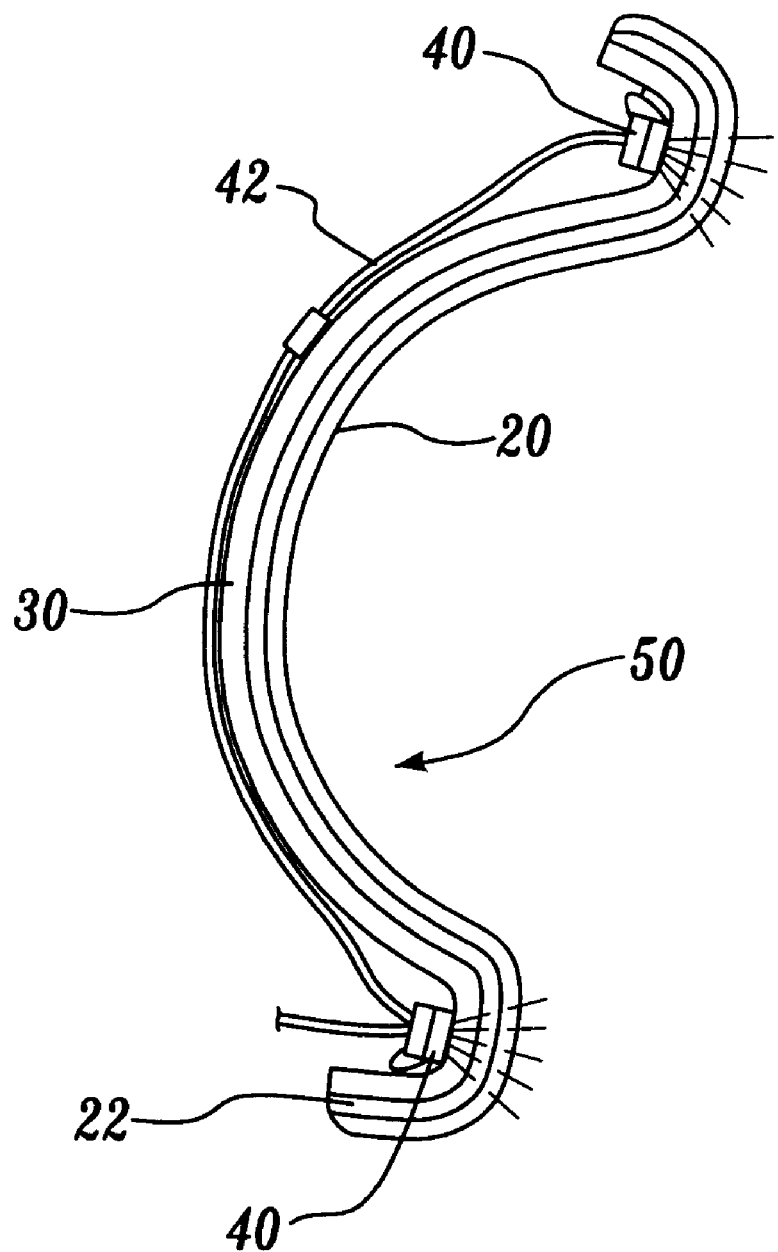
FIG. 4 is a cross-sectional view of a representative decorative lighting laminate, the door handle escutcheon shown in FIG. 3.

Decorative lighting laminates formed in accordance with the present invention are useful as parts for commercial and military aircraft interiors as well as for automotive, trucking, railway, and bus interiors. FIG. 3 illustrates a representative decorative lighting laminate, door escutcheon 50, positioned on aircraft emergency exit 60. A cross-sectional view of escutcheon 50 is shown in FIG. 4. Referring to FIG. 4, escutcheon 50 includes translucent decorative covering layer 20, intermediate layer 22, transparent base layer 30, and fight sources 40 (having supply leads 42).

The present invention provides a decorative, light-transmitting laminate that can be molded and formed into aircraft interior components or parts that can be made to illuminate on demand. These interior parts are decorative in that there is no visual indication of display until light sources associated with the part are illuminated. The decorative lighting laminates formed in accordance with the present invention include no lenses and have no optical surfaces. Thus, the laminate parts require no optimization of light transmission. Decorative lighted laminates formed in accordance with the present invention are particularly useful for indicating exits and routes in commercial aircraft interiors under emergency conditions. The decorative lighting laminate can also be used for nonemergency applications including, for example, displaying an airline's logo or trademark.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An aircraft interior lighting part consisting essentially of:
    a light-transmitting laminate having a first transparent base layer, a second translucent decorative layer, and a layer comprising an adhesive material intermediate the base and decorative layers; and
    a light source,
    wherein the light source is positioned adjacent the base layer, and wherein the translucent layer has an opacity sufficient to shield the light source from view when not illuminated.

2. The aircraft interior lighting part of claim 1 wherein the base layer comprises clear polycarbonate.

3. The aircraft interior lighting part of claim 1 wherein the base layer comprises a fiberglass laminate.

4. The aircraft interior lighting part of claim 3 wherein the fiberglass laminate is selected from the group consisting of fiberglass-epoxy and fiberglass-polyester laminates.

5. The aircraft interior lighting part of claim 1 wherein the base layer has a thickness of between about 0.010 inch to about 0.125 inch.

6. The aircraft interior lighting part of claim 1 wherein the decorative layer comprises a fluorinated organic polymeric material selected from the group consisting of a polyvinyl fluoride and a polyvinylidene fluoride polymeric material.

7. The aircraft interior lighting part of claim 1 wherein the decorative layer has a thickness of between about 0.0015 inch and about 0.0040 inch.

8. The aircraft interior lighting part of claim 1 wherein the adhesive material comprises an acrylic adhesive.

9. The aircraft interior lighting part of claim 1 wherein the light source is a light-emitting diode.

10. The aircraft interior lighting part of claim 1 wherein the light source comprises an array of light-emitting diodes.

11. An aircraft interior lighting part comprising:
    a light-transmitting laminate having a first transparent base layer comprising clear polycarbonate; a second translucent decorative layer comprising a fluorinated organic polymeric material selected from the group consisting of a polyvinyl fluoride and a polyvinylidene fluoride polymeric material; and a layer comprising an acrylic adhesive intermediate the base and decorative layers; and
    at least one light-emitting diode, wherein the light-emitting diode is positioned adjacent the base layer, and wherein the translucent layer has an opacity sufficient to shield the light-emitting diode from view when not illuminated.

12. A method for forming an aircraft interior lighting part comprising:
    laminating a translucent decorative layer onto a transparent base layer to form a light-transmitting laminate, wherein the decorative layer is affixed to the base layer by an intermediate layer comprising an adhesive material;
    thermoforming the laminate on an aircraft interior part mold die to provide a molded laminate; and
    affixing at least one light source to the molded laminate to provide an aircraft interior lighting part, wherein the light source is positioned adjacent the base layer, and wherein the translucent layer has an opacity sufficient to shield the light source from view when not illuminated.

13. The method of claim 12 wherein the base layer comprises clear polycarbonate.

14. The method of claim 12 wherein the base layer comprises a fiberglass laminate.

15. The method of claim 12 wherein the decorative layer comprises a fluorinated organic polymeric material selected from the group consisting of a polyvinyl fluoride and a polyvinylidene fluoride polymeric material.

16. The method of claim 12 wherein the adhesive material comprises an acrylic adhesive.

17. The method of claim 12 wherein the light source is a light-emitting diode.

18. The method of claim 12 wherein the light source comprises an array of light-emitting diodes.

19. A decorative lighting laminate consisting essentially of:
 a light-transmitting laminate having a first transparent base layer, a second translucent decorative layer, and a layer comprising an adhesive material intermediate the base and decorative layers; and
 a light source, wherein the light source is positioned adjacent the base layer, and wherein the translucent layer has an opacity sufficient to shield the light source from view when not illuminated.

20. The laminate of claim 19 wherein the base layer comprises clear polycarbonate.

21. The laminate of claim 19 wherein the base layer comprises a fiberglass laminate.

22. The laminate of claim 19 wherein the decorative layer is a fluorinated organic polymeric material selected from the group consisting of a polyvinyl fluoride and a polyvinylidene fluoride polymeric material.

23. The laminate of claim 19 wherein the adhesive material comprises an acrylic adhesive.

24. The laminate of claim 19 wherein the light source is a light-emitting diode.

25. The laminate of claim 19 wherein the light source comprises an array of light-emitting diodes.

26. The laminate of claim 19 wherein the decorative lighting laminate forms an aircraft interior part.

* * * * *